June 26, 1945.   A. L. SHIELDS   2,379,193
REFRIGERATION APPARATUS
Filed June 3, 1941
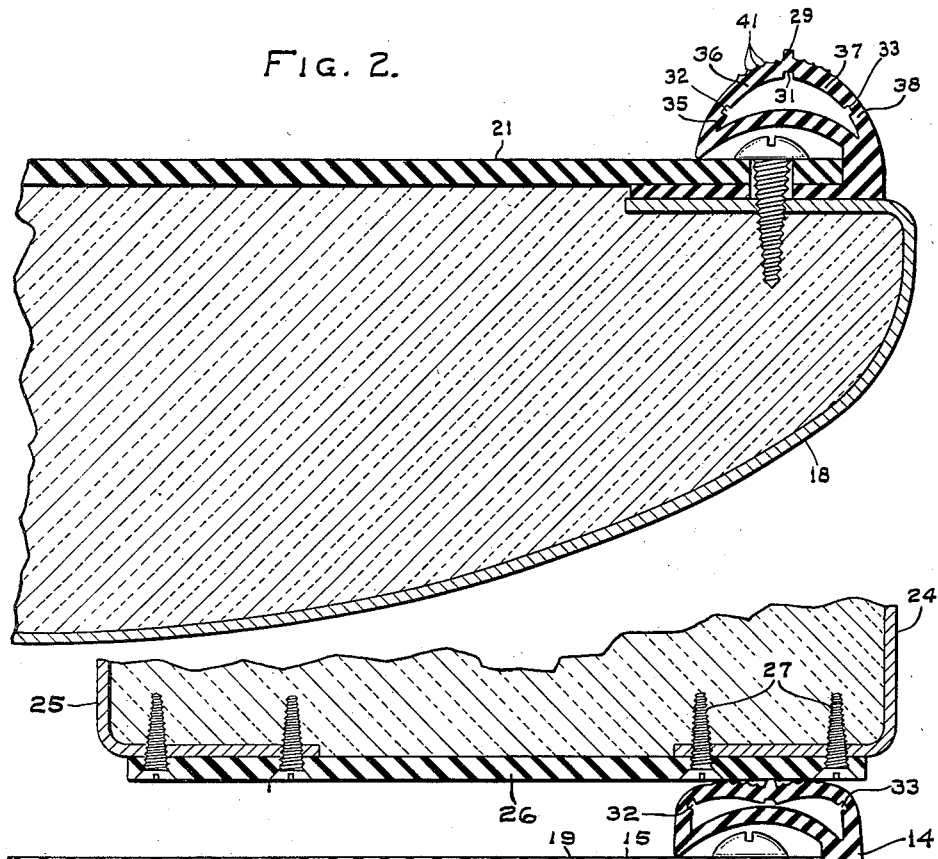
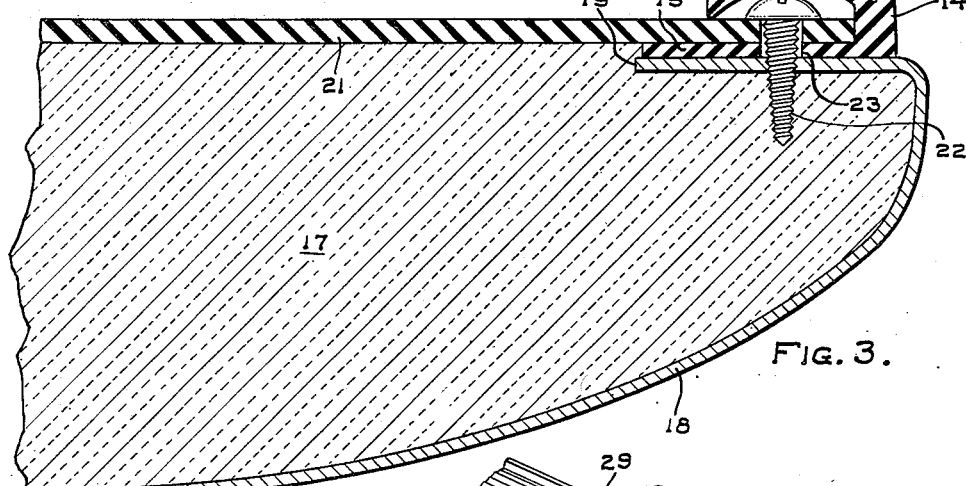
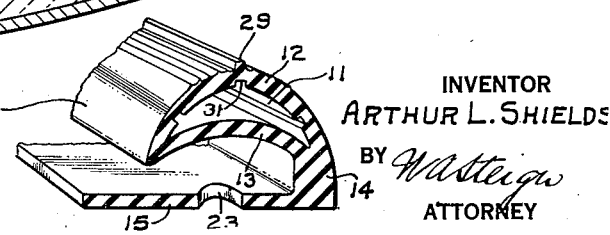
WITNESSES:
INVENTOR
ARTHUR L. SHIELDS
BY
ATTORNEY Patented June 26, 1945

2,379,193

UNITED STATES PATENT OFFICE 2,379,193

REFRIGERATION APPARATUS

Arthur L. Shields, Springfield, Mass., assignor to Westinghouse Electric Corporation, East Pittsburgh, Pa., a corporation of Pennsylvania Application June 3, 1941, Serial No. 396,376

4 Claims. (Cl. 20—69)

This invention relates to a refrigerator cabinet construction and more especially to a gasket for such a cabinet.

One object of the invention is to provide a gasket which is soft and resilient and which retains its sealing efficiency for a long period of time.

Another object of the invention is to provide a soft and resilient gasket in which ineffectual sidewardly deflection is avoided.

A further object of the invention is to provide a gasket which effects a plurality of contacts with the surface against which it seals.

These and other objects are effected by my invention as will be apparent from the following description and claims taken in connection with the accompanying drawing, forming a part of this application, in which:

Fig. 1 is a view in perspective of a portion of the refrigerator gasket of this invention;

Fig. 2 is a fragmentary section of a refrigerator door embodying the gasket of this invention; and, Fig. 3 is a fragmentary section of a refrigerator cabinet and the door embodying the gasket of this invention.

Referring to the drawing for a detailed description of the invention, the reference numeral 10 represents the gasket of this invention. The gasket 10 comprises a tubular portion 11 of crescent-shaped section having an outer wall 12 and an inner wall 13. One edge of the crescent-shaped section is formed with an extension 14 which connects with an attachment flange 15 formed integrally with the tubular section 11. The gasket 10 is formed of flexible rubber, or rubber-like compound, by an extrusion process.

The gasket 10 is adapted for securement to a refrigerator door 17 of the type shown in the patent to O. H. Yoxsimer, No. 2,213,155, issued August 27, 1940, and assigned to to the assignee of the present application. The door 17 comprises a dished outer panel 18 of sheet metal, one edge 19 of which is bent inwardly. An inner panel 21 of thin, rigid heat-insulating material is secured to the inturned edge 19 of the outer panel 18 by sheet metal screws 22. The attachment flange 15 of the gasket 10 is located between the edge portions of the panel 21 and the inturned edge 19 of the outer panel 18 and is clamped therebetween. The screws 22 pass through holes 23 in the attachment flange 15 to engage the inturned edge 19. The extension 14 of the gasket 10 lies adjacent the edge of the panel 21 and the tubular portion 11 overlies the heads of the screws 22.

The door 17 is adapted for use in a refrigerator cabinet having a sealing surface about the door opening which lies substantially in one plane. The cabinet may comprise a side wall formed by an outer shell 24 having an inturned edge portion and an inner food liner 25 having an outwardly-turned edge portion lying in the same plane as the inwardly-turned edge portion of the outer shell 24. The inwardly-turned edge portion is spaced from the outwardly-turned edge portion and the space between the two is bridged by a heat breaker strip 26 of thin, rigid heat-insulating material, which strip 26 is secured to the respective edge portions by screws 27.

The gasket comprises a ridge 29 centrally of, and on the outer surface of the wall 12, said ridge 29 forming the point of first contact with the cabinet when the door 17 is being closed. Immediately adjacent the ridge 29, but on the inner side of the outer wall 12, is a groove 31 which decreases the thickness of the wall 12 on both sides of the ridge 29 and thereby renders the wall 12 more flexible at this point.

Two additional grooves 32 and 33 are also formed on the inner surface of the walls, which grooves 32 and 33 lie on opposite sides of the groove 31 respectively, and spaced therefrom. The two grooves 32 and 33 are preferably located at the point of greatest flexure of the wall 12 when the gasket 10 is compressed into sealing engagement, the points of greatest flexure being determined from a similar wall but without the grooves 32 and 33.

The grooves 31, 32 and 33 divide the outer wall 12 of the gasket 10 into four relatively inelastic panels 35, 36, 37 and 38 which provide strength, durability and stability to the gasket 10. The outer surface of the wall 12 adjacent the edge 29 is provided with small ridges 41.

When the door 17 is being closed, the ridge 29 depresses the nearest edges of the panels 36 and 37 so that the wall 12 assumes the general shape of a bow. The edges of the side panels 35 and 38 adjacent the grooves 32 and 33, respectively, are preferably constructed to deflect outwardly an equal distance to hold the two central panels 36 and 37 and the ridge 29 centrally with respect to the tubular portion 11 of the gasket 10 so that the wall 12 cannot deflect sidewardly to deform the tubular portion 11 into a lopsided configuration. The outer wall 12 will continue to deflect in this manner even after long service.

When the ridge 29 is depressed a substantial distance by the closing of the door 17, the small ridges 41 of the panels 36 and 37 will also contact the sealing surface of the cabinet and form additional points of contact therewith.

The grooves 32 and 33 are preferably formed on the inside surface of the wall 12 for the sake of appearance and to provide a relatively smooth and easily-cleaned exterior surface of the gasket. The grooves 32 and 33, however, may also be placed on the outer surface of the wall 12. The groove 31 may likewise be placed on the outer surface of the wall 12, and in that case would take the form of two grooves, one on each side of the ridge 29. The beneficial results of this invention may also be secured by a mere thinning of portions of the wall 12 at the desired location.

It will be obvious from the above that this invention provides a gasket suitable for use on a refrigerator door, which gasket is soft and resilient and which retains its sealing efficiency for a long period of time. The gasket is further designed to avoid sideward deflection and effects a plurality of contacts with the surface against which it seals.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A gasket member comprising an elongated unit of rubber including a relatively flat base flange and a cushion member of crescent shape in cross section and attached along one edge to an edge of the flange and overhanging said flange at its free edge in juxtaposition to the corresponding edge of the base flange, the cushion member having a longitudinal ridge on the exterior of its wall remote from the base flange substantially midway between its lateral edges, the inner surface of said wall having a longitudinal groove in the region of said ridge.

2. A gasket comprising an elongated rubber cushion member of arcuate cross section, said cushion member having a longitudinal ridge on its convex side substantially midway between its lateral edges and a longitudinal groove on its concave side in the region of said ridge, said gasket including an elongated attachment flange secured at one edge to an edge of said cushion member.

3. A gasket element comprising a hollow, elongated cushioning member of rubber-like material and of arcuate cross section, said member having a longitudinal ridge on its convex side, said ridge being spaced from the lateral edges of said member, and a longitudinal groove in the concave side of said member in the region of said ridge.

4. A gasket element comprising a hollow, elongated cushioning member of rubber-like material and of arcuate cross section, said member having a longitudinal ridge on its convex side, said ridge being spaced from the lateral edges of said member, and a longitudinal groove in the concave side of said member in the region of said ridge, said groove defining a bending line when the hollow cushioning member is compressed.

ARTHUR L. SHIELDS.